W. H. BURK.
CONCRETE REINFORCE.
APPLICATION FILED JUNE 17, 1910.
1,043,198.
Patented Nov. 5, 1912.
7 SHEETS—SHEET 1.
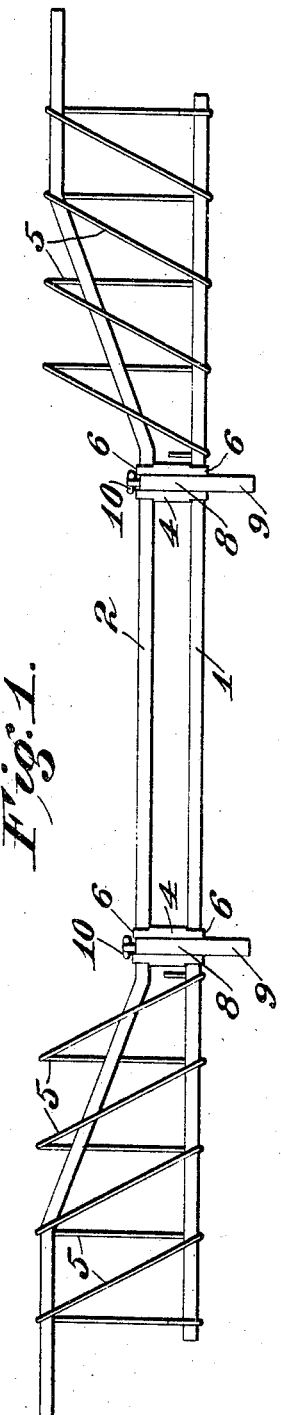
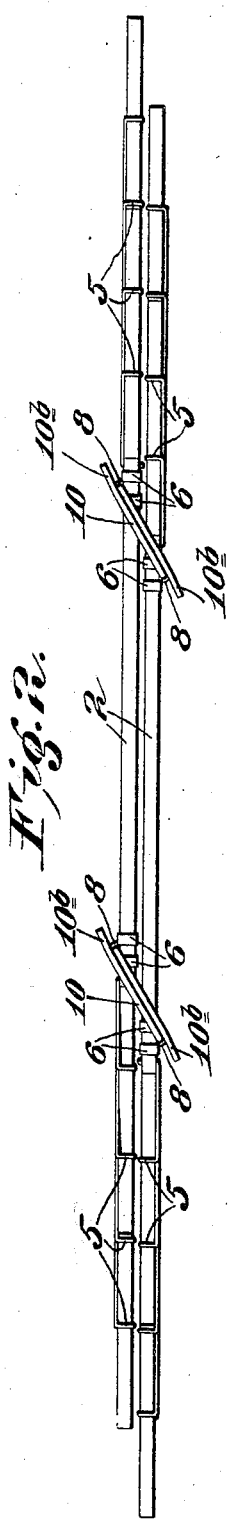
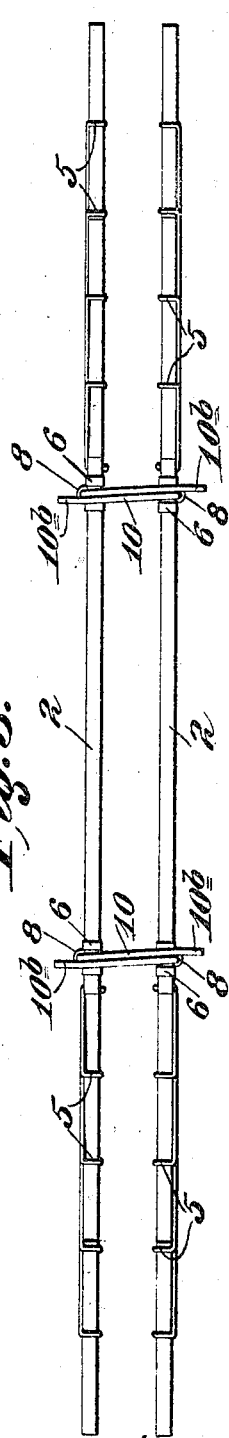
Witnesses:
Edgar T. Farmer
G. A. Pennington
Inventor:
William H. Burk,
By Court Carr, Attys.

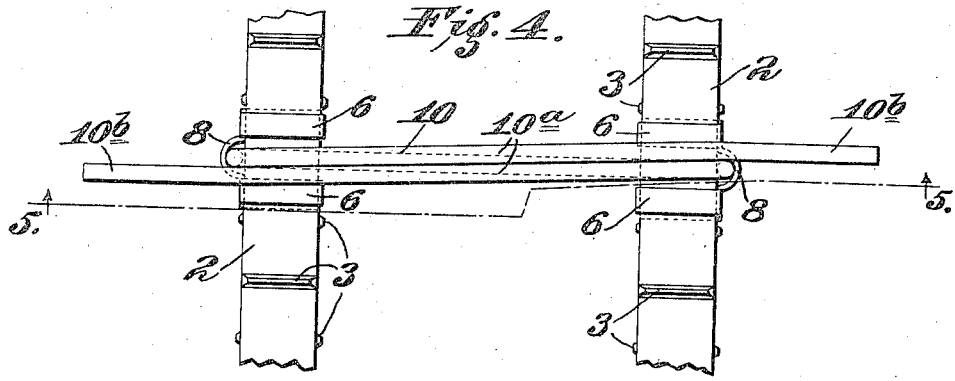
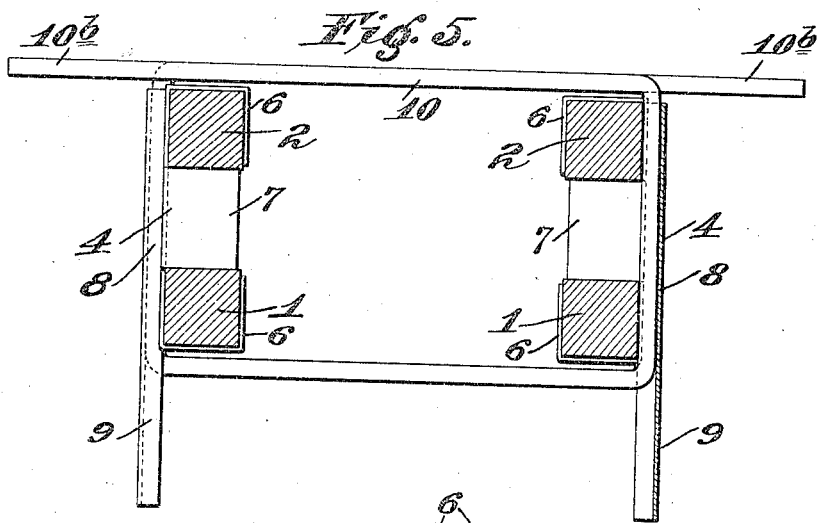
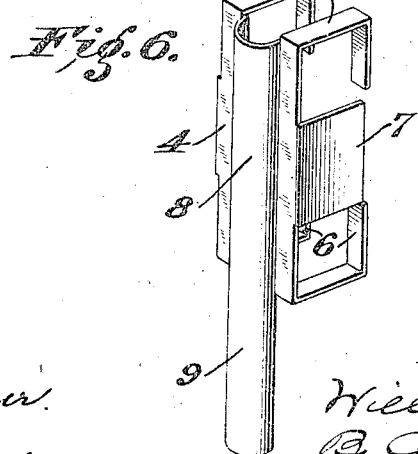

W. H. BURK.
CONCRETE REINFORCE.
APPLICATION FILED JUNE 17, 1910.
1,043,198.
Patented Nov. 5, 1912.
7 SHEETS—SHEET 3.
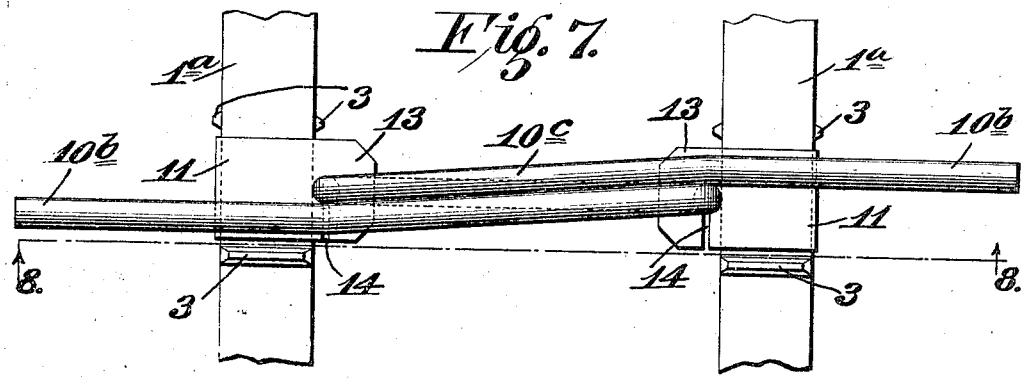
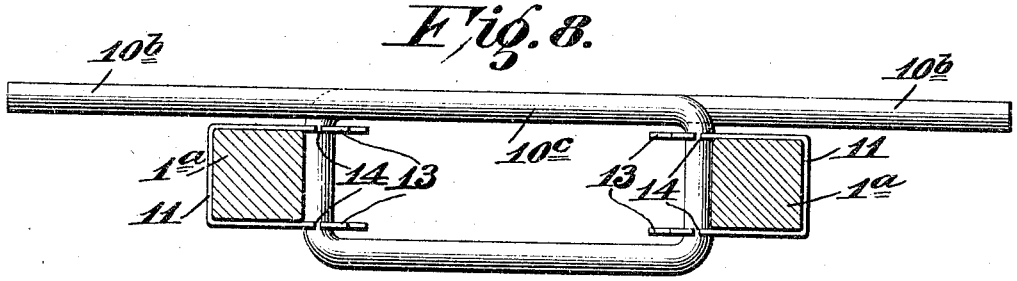
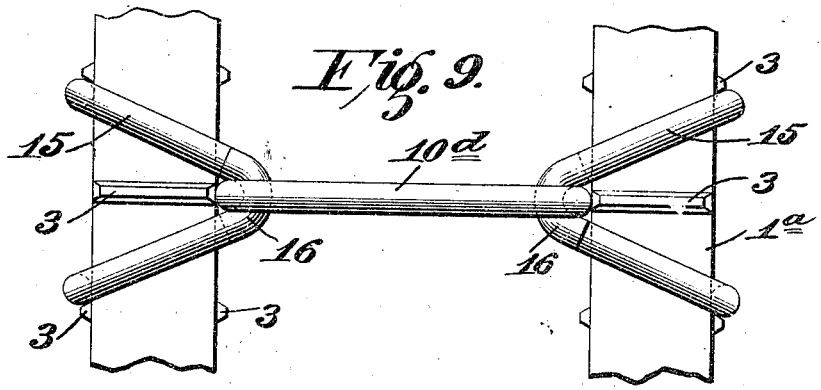
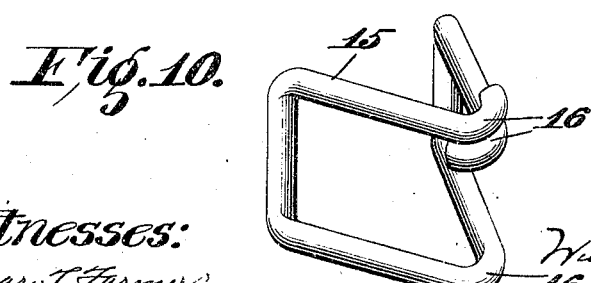
Witnesses:
Edgar T. Farmer
G. A. Pennington
Inventor:
William H. Burk,
By Carr &
Attys.

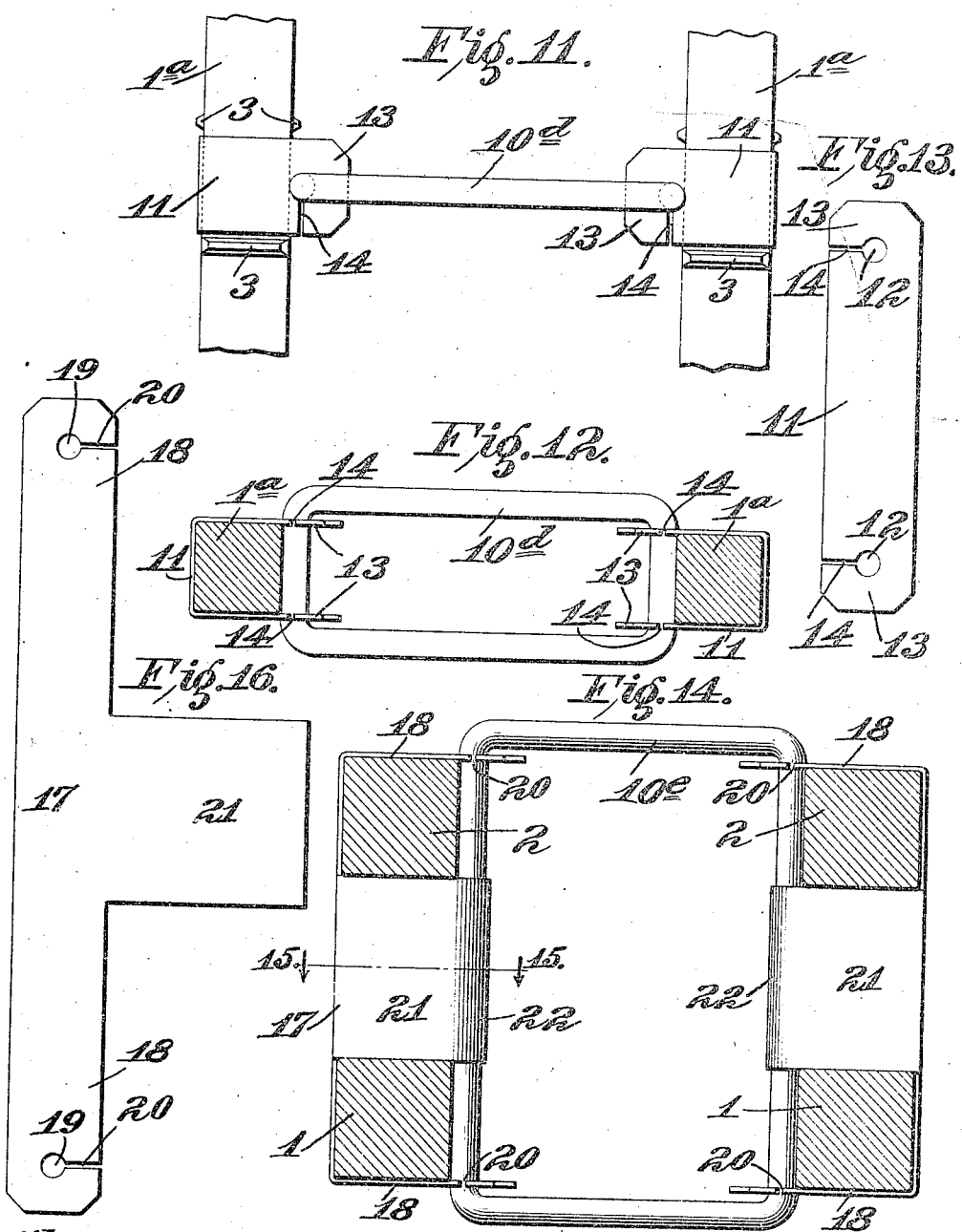

W. H. BURK.
CONCRETE REINFORCE.
APPLICATION FILED JUNE 17, 1910.
1,043,198.
Patented Nov. 5, 1912.
7 SHEETS—SHEET 5.
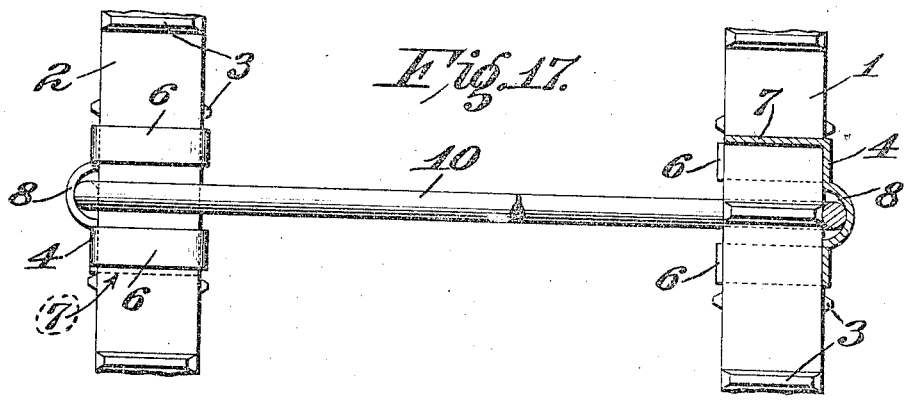
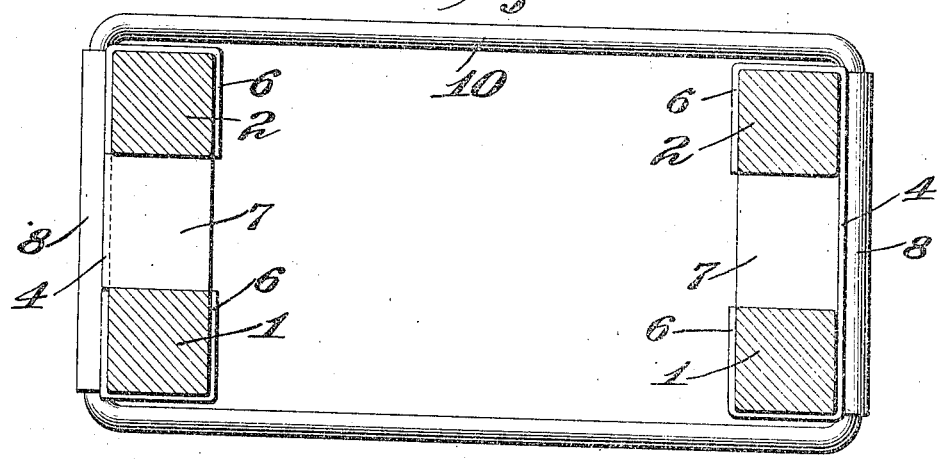
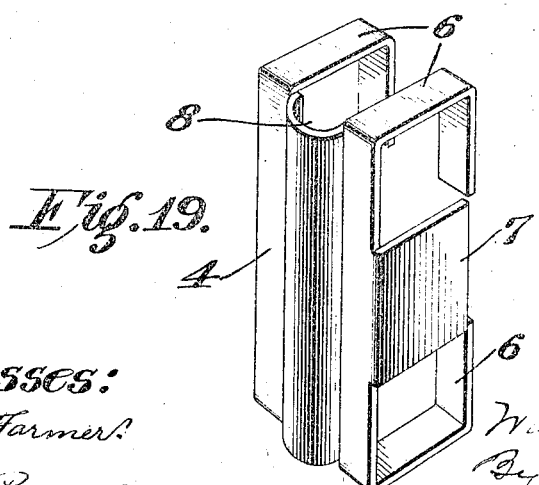
Witnesses:
Edgar T. Farmer
G. A. Pennington
Inventor:
William H. Burk,
By Cam & Dann,
attys.

W. H. BURK.
CONCRETE REINFORCE.
APPLICATION FILED JUNE 17, 1910.
1,043,198.
Patented Nov. 5, 1912.
7 SHEETS—SHEET 6.
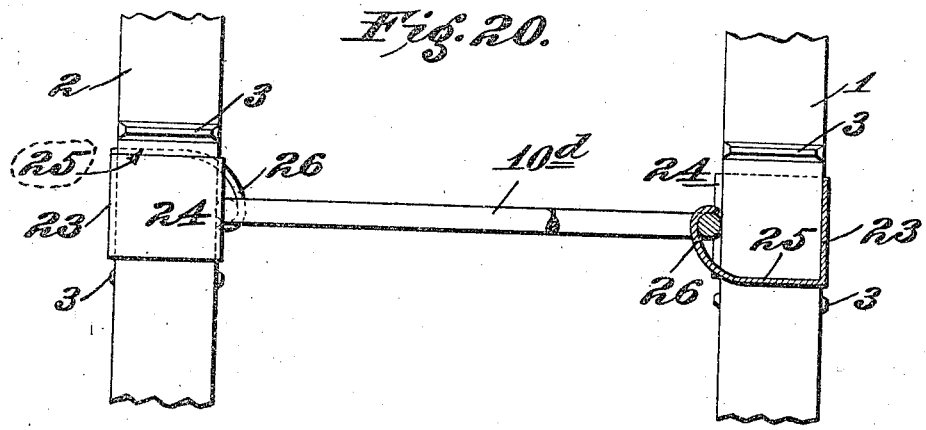
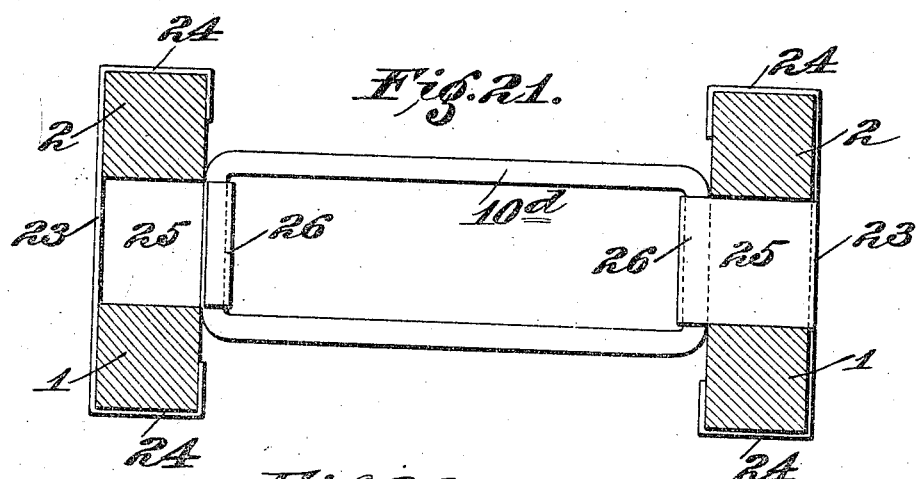
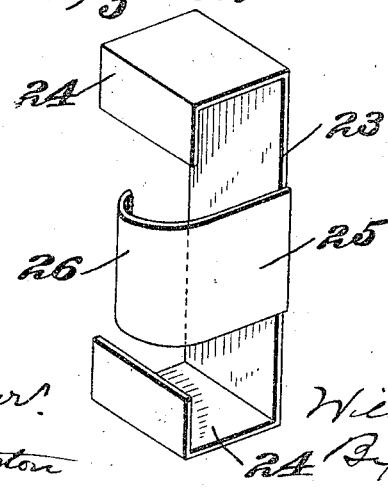
Witnesses:
Edgar T. Farmer
G. A. Pennington
Inventor:
William H. Burk,
By Coun ... ,
Attys.

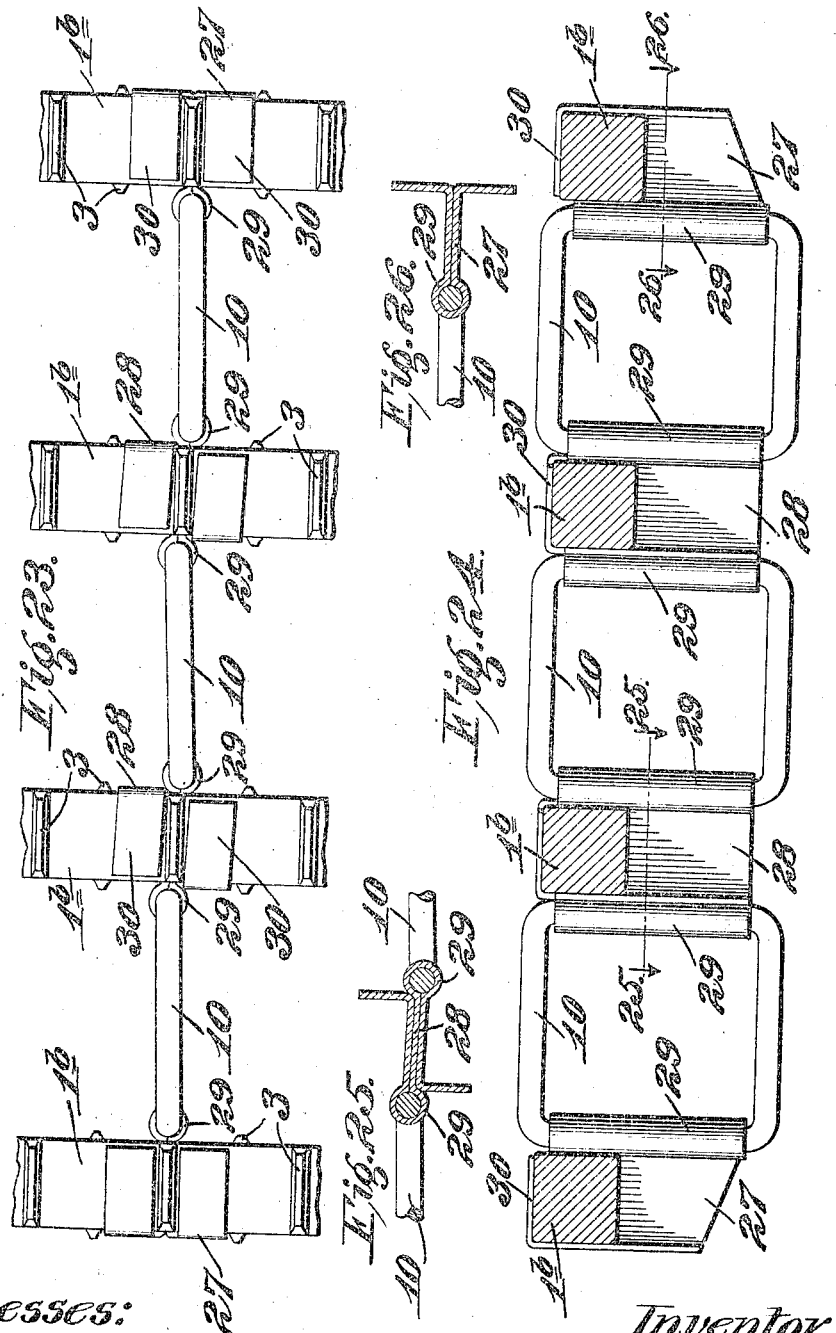

UNITED STATES PATENT OFFICE.

WILLIAM H. BURK, OF ST. LOUIS, MISSOURI, ASSIGNOR TO CORRUGATED BAR COMPANY, OF ST. LOUIS, MISSOURI, A CORPORATION OF MISSOURI.

CONCRETE REINFORCE.

1,043,198.  Specification of Letters Patent.  Patented Nov. 5, 1912.

Application filed June 17, 1910. Serial No. 567,347.

*To all whom it may concern:*

Be it known that I, WILLIAM H. BURK, a citizen of the United States, and a resident of the city of St. Louis and State of Missouri, have invented a new and useful Improvement in Concrete Reinforces, of which the following is a specification.

In the construction of reinforced concrete beams and like structures, it is the common practice to position the several bars or other reinforcing members individually at the work; and with unskilful workmen and unfavorable conditions at the work, the actual positions of the reinforcing members are liable to vary from the positions they are designed to occupy. On the other hand, if the reinforcing members are assembled at the factory, in proper relation to each other, they are liable to be bent or to be shifted with relation to each other before reaching the work.

The principal object of the present invention is to provide for the assembling of the reinforcing members into a unitary frame which will minimize the risk of having its members distorted or unintentionally shifted in relation to each other during shipment.

Another object is to make the distance between the side members easily adjustable and to facilitate the spacing of one unit frame from another.

The invention consists in the constructions and arrangements of parts hereinafter described and claimed.

In the accompanying drawings which form part of this specification and wherein like symbols refer to like parts wherever they occur, Figure 1 is a side elevation (omitting some details) of a reinforcing frame embodying my invention; Fig. 2 is a top plan view showing the unit frame in its collapsed condition; Fig. 3 is a top plan view showing the frame in its open or normal condition; Fig. 4 is a fragmentary top plan view on an enlarged scale, showing the frame in open position; Fig. 5 is a transverse vertical section on the line 5—5 of Fig. 4; Fig. 6 is a detail perspective view of a spacing clip detached; Fig. 7 is a fragmentary top plan view of a collapsible unit frame having single reinforcing members; Fig. 8 is a section on the line 8—8 of Fig. 7; Fig. 9 is a fragmentary top plan view of a reinforcing frame similar to that shown in Fig. 7 but having a modified form of link and clip; Fig. 10 is a detail perspective view of the wire clip shown in Fig. 9; Fig. 11 is a fragmentary plan view similar to Fig. 7 but showing a modified form of link; Fig. 12 is a transverse vertical section through the frame shown in Fig. 11; Fig. 13 is a plan view of the blank from which the securing clip shown in Figs. 7 and 11 is formed; Fig. 14 is a transverse vertical section through a further modified construction and arrangement of reinforcing frame; Fig. 15 is a section on the line 15—15 of Fig. 14; Fig. 16 is a plan view of the blank from which the clip shown in Fig. 14 is formed; Fig. 17 is a fragmentary view, partly in top plan and partly in horizontal section, showing a modification of the reinforcing frame illustrated in Figs. 1 to 6, inclusive; Fig. 18 is a transverse vertical section through the frame shown in Fig. 17; Fig. 19 is a detail perspective view of the distance piece or spacing clip shown in Figs. 17 and 18; Fig. 20 is a fragmentary view, partly in top plan and partly in horizontal section, showing a modification of the clip and link; Fig. 21 is a transverse vertical section through the frame shown in Fig. 20; Fig. 22 is a detail perspective view of the spacing clip illustrated in Figs. 20 and 21; Fig. 23 is a fragmentary top plan view showing a reinforcing frame comprising four parallel single bars or main reinforcing members; Fig. 24 is a transverse vertical section through the frame shown in Fig. 23; Fig. 25 is a section on the line 25—25 of Fig. 24; and Fig. 26 is a section on the line 26—26 of Fig. 24.

In the construction illustrated in Figs. 1 to 5, inclusive, the main reinforcing members are framed together in two groups each of which constitutes a side of a collapsible unit frame. In this construction, the primary reinforcing members of each side comprise a straight horizontal bar 1 at the bottom and a second bar 2 located above it, both of which are preferably corrugated to provide transverse ribs 3 (see Fig. 4). The middle portion of the second bar is parallel with the first mentioned bar but, at each end of said middle portion, said second bar inclines upwardly and thence extends horizontally to each end, in conformity with the common practice; and the ends of said second or upper bar are preferably carried some distance beyond the ends of the bottom bar. The two bars thus constituting the primary reinforcing members of a side of the unit frame are firmly held together by suitable spacing clips or distance pieces 4, preferably of the kind hereinafter more fully described. The respective side frames constituting the primary reinforce, in practice, support groups of secondary reinforcing members or loops 5, whose principal function is to take care of the shearing stresses and diagonal tension stresses in the beam. The side frames or members of the complete unit frame are connected together by links 10 of any suitable type that will permit such side members to come together. As illustrated in Figs. 1 to 6, inclusive, the distance pieces or spacing clips 4 which hold together the main reinforcing bars of a side frame or member comprise a sheet metal blank whose opposite end portions are slitted to provide tongues 6 which are bent around the respective bars 1, 2, on opposite sides of a rib 3. Lateral extensions 7 of the body portion of the blank are turned inwardly between the two bars 1, 2. The portion of the blank between the top tongues is removed and the body portion of the blank is crimped or grooved vertically as at 8. The portion between the bottom tongues is retained intact with the body portion, and crimped in line with the crimped portion 8 to constitute a foot 9 which is adapted to rest upon the centering or false work, so as to support the unit frame in the proper position vertically it is to occupy in the completed floor or beam. The links 10 are each preferably made of a continuous strip of stiff wire bent into the form of a rectangle with the end portions of the wire overlapping at the top of the frame as at 10ª and extending respectively beyond the opposite ends of the rectangle as at 10ᵇ. The vertical sides of the rectangular link 10 are hinged between the outer sides of the respective bars 1, 2, and the crimped or grooved portion 8 of the distance piece. The extensions 10ᵇ are provided for the purpose of properly spacing the several unit frames when a multiplicity of the same are employed in reinforcing a beam or floor. That is, the several collapsible units are opened as they are assembled in position and the adjoining units are brought together until the ends of said extensions 10ᵇ touch in the same longitudinal plane. It is therefore obvious that the length of said projections depends upon the desired space between the respective unit frames, and said extensions are approximately one-half of the distance.

As shown in Figs. 7 and 8, the collapsible frame comprises single-bar side members 1ª. In this construction, the securing clips 11 are formed from a single blank or sheet of metal whose end portions are perforated and slitted transversely from one side. The opposite end portions of the blank are folded over the top and bottom of the bar, respectively, and the vertical sides of the rectangular link 10ᶜ are pivoted in the perforations 12. In order to insert the vertical sides of the rectangular link 10ᶜ into said perforations 12, the end portions 13 of the clip 11 are bent or sprung to open the slots 14 sufficiently to permit the link to be slipped therethrough. The end portions 13 of the clip 11 are then bent or permitted to spring back to normal position, as the case may be, after the link is in position.

In Figs. 9 and 10, the unit frame is provided with a link 10ᵈ from which the end extensions 10ᵇ are eliminated. This link 10ᵈ is pivotally mounted in a clip 15 comprising a single strip of stiff wire which is bent and rebent so as to fit over the respective bars 1ª and to provide looped portions 16 in which the link 10ᵈ is pivoted.

In Figs. 11 and 12, a frame similar to that illustrated in Figs. 7 and 8 is shown, the only difference being that the link 10ᵈ is substituted for the link 10ᶜ.

In Figs. 14 and 15 a clip and distance piece 17 somewhat similar to the clip 11 above described, is shown. The opposite end portions 18 of the distance piece 17 are perforated as at 19 and slitted as at 20 in a manner similar to the clip 11. These end portions 18 are bent over the top and bottom bars 1, 2, respectively, and have the vertical sides of the link 10ᶜ pivoted therein. The middle portion of the distance piece 17 is extended laterally as at 21 and it is bent inwardly between the bars 1 and 2; and the inner end portion 22 is bent around the adjacent vertical side of the rectangular link 10ᶜ.

The construction shown in Figs. 17 to 19, inclusive, is similar to that illustrated in Figs. 1 to 6, inclusive, the difference being that the feet 9 on the distance pieces and the extensions 10ᵇ on the links are eliminated.

As shown in Figs. 20 to 22, inclusive, the side frames of the unit comprise two members 1, 2, which are secured together by spacing clips or distance pieces 23 whose opposite end portions 24 are bent around the respective bars 1, 2, and having an intermediate portion 25 which is bent inwardly between the two bars. The inner end 26 of the portion 25 is curled around the link 10ᵈ.

In Figs. 23 and 24, a collapsible unit frame comprising four parallel single bars or members is illustrated. In this construction, the bars 1ᵇ are secured on distance pieces or supports 27, 28. The distance pieces 27, 28 are each formed of a single blank whose middle portion is rebent and folded upon itself to provide vertical eyes or loops 29, the only difference being that the distance pieces 27 are made with a single eye or loop, while the members 28 are made double; that is, they are provided with two vertical eyes or loops. These distance pieces 27, 28 are notched to provide seats for the bars 1ᵇ and have tongue portions 30 which are bent over the tops of the bars to hold the same in place. These distance pieces and hinge members 27, 28 serve to space the main reinforcing bars from the centering or false work in the manner similar to the feet 9 hereinbefore referred to.

It is noted that by reason of the parallel members or side frames being linked together, the construction may be collapsed for shipment, in which condition it is less bulky and less liable to injury. So, too, it is noted that if the centering should accidentally be made narrower than designed, the pivotally mounted links will permit the side frames to be displaced longitudinally, thus decreasing the spaces between the side frames without affecting the parallel relation of the side frames. Furthermore, the construction and arrangement of the links offers little or no obstruction to the flow of the concrete.

While the foregoing description relates to unit frames having either single or double side members, it is obvious that the invention may be embodied in a unit frame having any number of parallel frames or side members. So, too, it is obvious that it is not necessary that the parallel frames or members should be counterparts of each other. For instance, the middle member of the collapsible unit may be a single bar and the side members may be single bars, or two or more bars, without departing from my invention.

What I claim is:

1. A concrete reinforce comprising parallel reinforcing bars and rigid parallel links collapsibly connecting said bars together, said links comprising rectangular loops of metal the oppositely disposed ends of which are extended to project beyond the planes of the bars when said bars are spread apart, and means for pivotally mounting said links on said bars.

2. A collapsible reinforcing unit frame comprising parallel side frames and rigid links pivotally connecting said side frames together, said links being longer than the distance between said side frames when spaced apart and pivoted intermediate their ends to said side frames to extend beyond the outer sides of the respective side frames when the unit frame is opened, and to lie diagonally across said side frames when the frame is in closed position.

3. A collapsible reinforcing unit frame comprising parallel reinforcing members, rigid links connecting said parallel reinforcing members, the opposite end portions of said links being arranged and adapted to extend beyond the outer sides of said parallel reinforcing members when the frame is opened, and means for pivotally securing said links to said members and positioning said unit frame vertically in the concrete structure.

4. A collapsible reinforcing unit frame comprising parallel vertical side frames which are pivotally connected together by rigid links, said side frames comprising reinforcing bars and spacing clips arranged and adapted to hold them in proper relation to each other, said spacing clips being pivotally connected to said links and having downward extensions arranged and adapted to support the unit frame in its position vertically in the concrete structure.

5. A collapsible reinforcing unit frame comprising parallel reinforcing members, clips secured to said reinforcing members, and rigid links comprising rectangular wire frames which are pivoted at their opposite ends to said clips, said links comprising a single strip of wire whose opposite end portions are extended so as to project laterally beyond the outer sides of said reinforcing members when the unit frame is opened.

6. A collapsible reinforcing unit frame comprising parallel vertical side frames, said side frames comprising reinforcing bars and spacing clips for holding said reinforcing bars in proper relation to each other, said spacing clips each comprising a sheet metal blank whose opposite end portions are folded around the adjacent reinforcing bars and having intermediate portions projecting inwardly between the bars, and the body portion of said blank being grooved vertically, and rigid links comprising rectangular wire frames whose vertical sides are pivotally fitted between the outer sides of the adjacent bars and the vertically grooved portion of the adjacent clip.

7. A collapsible reinforcing unit frame comprising parallel vertical side frames, said side frames comprising reinforcing bars and spacing clips arranged and adapted to hold said bars in proper relation to each other, said spacing clips comprising a sheet metal blank whose opposite end portions are bent around the respective bars and having an intermediate portion extending inwardly between said bars, said blank having a vertical outwardly crimped portion and a downward extension adapted to support said unit frame, and rigid parallel links pivotally connecting said side frames together and adapted to hold them in open position, said links comprising rectangular frames whose vertical sides are pivotally fitted between the outer sides of the adjacent reinforcing bars and said vertically crimped portion in the adjacent spacing clips.

8. A collapsible reinforcing unit frame comprising parallel vertical side frames, said side frames comprising reinforcing bars and spacing clips arranged and adapted to hold said bars in proper relation to each other, said spacing clips comprising a sheet metal blank whose opposite end portions are bent around the respective bars and having an intermediate portion extending inwardly between said bars, said blank having a vertical outwardly crimped portion and a downward extension adapted to support said unit frame, and rigid parallel links pivotally connecting said side frames together and adapted to hold them in open position, said links each comprising one piece rectangular wire frames whose vertical sides are pivotally fitted between the outer sides of the adjacent reinforcing frame and the vertical crimped portion in the adjacent spacing clip and the opposite ends of the wire comprising said rectangular link being extended so as to project beyond the outer sides of the respective side frames when the unit frame is opened.

Signed at St. Louis, Missouri, this 14th day of June, 1910.

WILLIAM H. BURK.

Witnesses:
A. E. LINDAN,
G. A. PENNINGTON.